US008472378B2

(12) United States Patent
Ariyoshi et al.

(10) Patent No.: US 8,472,378 B2
(45) Date of Patent: Jun. 25, 2013

(54) COMMUNICATION SYSTEM, RADIO COMMUNICATION METHOD, AND RADIO APPARATUS

(75) Inventors: Masayuki Ariyoshi, Tokyo (JP); Kazushi Muraoka, Tokyo (JP); Takeo Fujii, Tokyo (JP)

(73) Assignees: NEC Corporation, Tokyo (JP); The University of Electro-Communications, Tokyo (JP)

( * ) Notice: Subject to any disclaimer, the term of this patent is extended or adjusted under 35 U.S.C. 154(b) by 432 days.

(21) Appl. No.: 12/808,975

(22) PCT Filed: Dec. 12, 2008

(86) PCT No.: PCT/JP2008/073135
§ 371 (c)(1),
(2), (4) Date: Jun. 17, 2010

(87) PCT Pub. No.: WO2009/084465
PCT Pub. Date: Jul. 9, 2009

(65) Prior Publication Data
US 2011/0199965 A1 Aug. 18, 2011

(30) Foreign Application Priority Data

Dec. 28, 2007 (JP) ................................ 2007-341277
Nov. 20, 2008 (JP) ................................ 2008-287696

(51) Int. Cl.
H04W 4/00 (2009.01)
(52) U.S. Cl.
USPC ....................................................... 370/328
(58) Field of Classification Search
None
See application file for complete search history.

(56) References Cited

U.S. PATENT DOCUMENTS

| 7,715,343 | B2 | 5/2010 | Tomioka | |
| 2007/0064770 | A1 | 3/2007 | Horiguchi | |
| 2007/0104140 | A1* | 5/2007 | Ashish et al. | 370/329 |
| 2007/0223394 | A1* | 9/2007 | Mizukoshi | 370/252 |
| 2010/0238903 | A1* | 9/2010 | Kitazoe | 370/332 |

FOREIGN PATENT DOCUMENTS

| JP | 2007-53546 A | 3/2007 |
| JP | 2007-88856 A | 4/2007 |
| JP | 2007/259113 A | 10/2007 |

OTHER PUBLICATIONS

Shridhar Mubaraq Mishra et al.; "Cooperative Sensing among Cognitive Radios"; Proc of IEEE International Conference on Communications, vol. 4, pp. 1658-1663, Jun. 2006.
Danijela Cabric et al.; "Implementation Issues in Spectrum Sensing for Cognitive Radios"; Proc of the Thirty-Eighth Asilomar Conference on Signals, Systems and Computers, Nov. 2004, vol. 1, pp. 772-776.

* cited by examiner

Primary Examiner — John Blanton
(74) Attorney, Agent, or Firm — Dickstein Shapiro LLP

(57) ABSTRACT

After checking a status of frequency band usage of a primary system by preliminary sensing, a master node transmits to slave nodes a sensing request containing a target frequency band for cooperative sensing. The slave nodes perform spectrum sensing according to specified parameters and send, as responses, results thereof to the master node. The master node collectively receives these results, comprehensively determines the sensing results of the slave nodes, and makes a final determination on whether or not the target frequency band is available.

25 Claims, 8 Drawing Sheets

COMMUNICATION SYSTEM, RADIO COMMUNICATION METHOD, AND RADIO APPARATUS

TECHNICAL FIELD

This invention relates to a radio communication system having a function of cognizing a surrounding radio environment, a radio communication method, and a radio apparatus, and more particularly, to a radio communication system in which a plurality of radio apparatus cognize a radio environment in collaboration with each other, a radio communication method, and a radio apparatus.

BACKGROUND ART

In a cognitive radio system, which is a radio communication system in which radio parameters are adaptively changed according to a surrounding radio environment, a surrounding radio environment is cognized and radio parameters are optimized according to the cognized radio environment.

The cognitive radio system is disclosed in, for example, Patent Document 1 (JP 2007-88856 A). In the cognitive radio system disclosed in Patent Document 1, a plurality of radio transceivers belonging to a given group perform radio communication by using a given communication scheme, and a plurality of radio transceivers belonging to another group perform radio communication by using another communication scheme. In a case where one of the plurality of radio transceivers belonging to the given group is a television broadcast station, and the other radio transceivers are television receivers, one of the plurality of radio transceivers belonging to the other group is a cognitive radio base station, and the other radio transceivers are cognitive radio terminals. Then, the cognitive radio base station and the cognitive radio terminals perform communication by using times and frequencies which are not used for television broadcasting. Accordingly, there is no need to consider interference between the given group and the another group.

In view of this, as a secondary system, a cognitive radio system shares a frequency band that is the same as a frequency band allocated to an existing radio communication system (hereinafter, may be referred to as primary system), to thereby improve the frequency usage efficiency.

In general, from a viewpoint of protecting the existing system, a basis of sharing a frequency band is that the primary system preferentially uses a frequency band that is allocated thereto in advance and the secondary system does not influence the primary system. Therefore, the secondary system is required to avoid interference to the primary system by, for example, using a frequency band that is not used by the primary system, or controlling transmission power to be smaller than an interference amount allowed by the primary system. In order to achieve this, the secondary system needs to correctly recognize a status of frequency band usage of the primary system, which is to be used by the secondary system.

Situations in which the secondary system recognizes the status of frequency band usage of the primary system may be classified into two main types. One type corresponds to a case in which, before performing communication, the secondary system detects communication of the primary system in a wide candidate frequency band that may be shared with the secondary system. The other type corresponds to a case in which the secondary system detects the primary system that has started communication in a frequency band that is being used by the secondary system. In both of the cases, if the secondary system detects communication of the primary system, the secondary system needs to take a measure to avoid the interference to the primary system in the corresponding frequency band.

As a specific method of detecting existence of communication of the primary system, there is spectrum sensing in which a radio apparatus of the secondary system detects a signal in its surrounding. Spectrum sensing includes a power detection method which is used for determination performed based on a magnitude of a received signal power determined based on a time average, and a method in which a feature amount contained in a transmitted signal of the primary system is used for detection. As the feature amount of the signal, cyclostationarity, a pilot signal, or the like contained in the transmitted signal of the primary system may be used (see, for example, Non-patent Document 1).

Non-patent Document 1: D Cabric, S M Mishra, and R W Brodersen, "Implementation issues in spectrum sensing for cognitive radios," Proc of the Thirty-Eighth Asilomar Conference on Signals, Systems and Computers, November 2004.

However, spectrum sensing performed by individual secondary system radio apparatus involves a problem that secure detection of the primary system is difficult due to influences of a surrounding radio propagation environment, including fading, shadowing, and distance attenuation. As a solution thereto, there has been studied a cooperative sensing scheme in which a detection accuracy is increased by combining spectrum sensing functions of a plurality of radio apparatus (see, for example, Non-patent Document 2).

Non-patent Document 2: Shridhar M Mishra, Anant Sahai and Robert W Brodersen, "Cooperative Sensing among Cognitive Radios," Proc of IEEE International Conference on Communications (ICC) 2006.)

FIG. 1 is a system conceptual diagram of cooperative sensing. In the example illustrated in FIG. 1, as a primary system, a radio apparatus 100 and a radio apparatus 110 communicate with each other. As a secondary system, radio apparatus 200, 210, 220, and 230 share the same frequency band as that of the primary system. Here, the radio apparatus 200, 210, 220, and 230 of the secondary system constitute a cooperative group for collaboration thereamong in terms of a spectrum sensing function. Among the radio apparatus, the radio apparatus 200 functions as a master node, controls each of the radio apparatus in the cooperative group, and makes, as the cooperative group, a determination on detection of whether or not communication of the primary system exists. The other radio apparatus 210, 220, and 230 function as slave nodes that perform a cooperative sensing operation according to an instruction issued by the master node. Therefore, hereinafter, the radio apparatus 200 may be referred to as master node 200, and the radio apparatus 210, 220, and 230 may be referred to as slave modes 210, 220, and 230, respectively.

A basic operation of cooperative sensing is as follows. The plurality of slave nodes 210, 220, and 230 belonging to the cooperative group perform spectrum sensing on a target frequency band. The plurality of slave nodes 210, 220, and 230 notify the master node 200 of results thereof as detection information. The master node 200 integrates notified detection information pieces to determine whether or not the communication of the primary system exists in the target frequency band.

In this manner, in cooperative sensing, influences of a radio propagation environment may be alleviated by virtue of a configuration in which the plurality of secondary system radio apparatus are spatially distributed. Therefore, detection performance may be improved in comparison with spectrum sensing performed by individual secondary system radio apparatus.

DISCLOSURE OF THE INVENTION

With regard to such an information exchange for cooperative sensing, various studies have been conducted on a method of improving a sensing accuracy by using exchanged results until now, but a way of exchanging information in an actual operation has not been studied. In cognitive radio, it is necessary to determine whether or not communication of the secondary system is possible under existence of the primary system, and hence sensing information needs to be exchanged before communicating data. Therefore, an exchange method that gives no influence on the primary system is needed. Further, in a case where a plurality of radio apparatus individually exchange packets with each other for exchanging information, there arises a problem that the exchanged packets occupy a radio band if the number of cooperating radio apparatus is large. In addition, there has been no study conducted regarding the control method, that is, what procedures are to be actually used for a master node to collect a determination result from each radio apparatus. In particular, it is a significant challenge to establish a control method for information exchange, which is used by the master node to obtain information on a necessary band from a wide frequency band when necessary.

In view of the above, this invention is intended to provide a method capable of exchanging sensing information in the secondary system without influencing the communication of the primary system.

This invention is further intended to provide a control method which enables the secondary system to use radio resources efficiently, and enables the master node to collect necessary sensing information from a wide frequency band when necessary.

According to a first aspect of this invention, there is provided a radio communication system that performs radio communication by sharing, between a first radio apparatus and at least one second radio apparatus, a frequency band used by another radio communication system without influencing the another radio communication system. In the radio communication system, the first radio apparatus comprises: a sensing section that observes a surrounding radio wave environment in a target frequency band to be used for communication; and a control section that determines, based on a result of the observing by the sensing section, whether or not the target frequency band is being used by the another radio communication system, and, when it is determined that the target frequency band is not being used by the another radio communication system, causes a transmission section to transmit, to the at least one second radio apparatus, an instruction signal for instructing the at least one second radio apparatus to observe the surrounding radio wave environment in the target frequency band. On the other hand, the at least one second radio apparatus comprises a section that receives the instruction signal and observes the surrounding radio wave environment in the target frequency band specified by the received instruction signal; and a section that sends, as a response, a result of observing the radio wave environment to the first radio apparatus under a predetermined condition or a condition specified by the received instruction signal. The first radio apparatus further comprises a determination section that makes a final determination on whether or not the target frequency band is available based on information on the result of observing the radio wave environment, which is received from the at least one second radio apparatus.

Also in a radio communication system according to a second aspect of this invention, radio communication is performed by sharing, between a first radio apparatus and at least one second radio apparatus, a frequency band used by another radio communication system without influencing the another radio communication system. In the radio communication system, the first radio apparatus comprises: a sensing section that observes a surrounding radio wave environment in a frequency band having a possibility of being available for communication; and a control section that cognizes, based on a result of the observing by the sensing section, as an available frequency band, a frequency band that is not being used by the another radio communication system from the frequency band having the possibility of being available for the communication, to thereby determine a target frequency band to be actually used, and causes a transmission section to transmit, to the at least one second radio apparatus, an instruction signal for instructing the at least one second radio apparatus to observe the surrounding radio wave environment in the target frequency band. On the other hand, the at least one second radio apparatus comprises: a section that receives the instruction signal and observes the surrounding radio wave environment in the target frequency band specified by the received instruction signal; and a section that sends, as a response, a result of observing the radio wave environment to the first radio apparatus under a predetermined condition or a condition specified by the received instruction signal. The first radio apparatus further comprises a determination section that makes a final determination on whether or not the target frequency band is available based on information on the result of observing the radio wave environment, which is received from the at least one second radio apparatus.

According to a third aspect of this invention, there is provided a radio communication method of performing radio communication by sharing, between a first radio apparatus and at least one second radio apparatus, a frequency band used by another radio communication system without influencing the another radio communication system. The radio communication method includes: observing, by the first radio apparatus, a surrounding radio wave environment in a target frequency band to be used for communication, and, as a result of the observing, when it is cognized that the target frequency band is not being used by the another radio communication system, transmitting, to the at least one second radio apparatus, an instruction signal for instructing the at least one second radio apparatus to observe the surrounding radio wave environment in the target frequency band; receiving, by the at least one second radio apparatus, the instruction signal, and observing the surrounding radio wave environment in the target frequency band specified by the received instruction signal; and further sending, as a response, by the at least one second radio apparatus, a result of observing the radio wave environment to the first radio apparatus under a predetermined condition or a condition specified by the received instruction signal; and making, by the first radio apparatus, a final determination on whether or not the target frequency band is available based on information on the result of observing the radio wave environment, which is received from the at least one second radio apparatus.

Also in a radio communication method according to a fourth aspect of this invention, radio communication is performed by sharing, between a first radio apparatus and at least one second radio apparatus, a frequency band used by another radio communication system without influencing the another radio communication system. The radio communication method includes: observing, by the first radio apparatus, a surrounding radio wave environment in a frequency band having a possibility of being available for communication, and, as a result of the observing, cognizing a frequency band that is not being used by the another radio communication system as an available frequency band from the frequency band having the possibility of being available for the communication, to thereby determine the available frequency band as a target frequency band to be actually used; further transmitting, by the first radio apparatus, to the at least one second radio apparatus, an instruction signal for instructing the at least one second radio apparatus to observe the surrounding radio wave environment in the target frequency band; receiving, by the at least one second radio apparatus, the instruction signal, and observing the surrounding radio wave environment in the target frequency band specified by the received instruction signal; further sending, as a response, by the at least one second radio apparatus, a result of observing the radio wave environment to the first radio apparatus under a predetermined condition or a condition specified by the received instruction signal; and making, by the first radio apparatus, a final determination on whether or not the target frequency band is available based on information on the result of observing the radio wave environment, which is received from the at least one second radio apparatus.

According to a fifth aspect of this invention, there is provided a radio apparatus for master node, which is used in a radio communication system that performs radio communication by sharing, between the radio apparatus for master node and at least one radio apparatus for slave node, a frequency band used by another radio communication system without influencing the another radio communication system. The radio apparatus for master node comprises: a sensing section that observes a surrounding radio wave environment in a target frequency band to be used for communication; a control section that determines, based on a result of the observing by the sensing section, whether or not the target frequency band is being used by the another radio communication system, and, when it is determined that the target frequency band is not being used by the another radio communication system, causes a transmission section to transmit, to the at least one radio apparatus for slave node, an instruction signal for instructing the at least one radio apparatus for slave node to observe the surrounding radio wave environment in the target frequency band; a reception section that receives a signal transmitted from the at least one radio apparatus for slave node; and a determination section that makes a final determination on whether or not the target frequency band is available based on information on a result of observing the radio wave environment, which is contained in the received signal.

A radio apparatus according to a sixth aspect of this invention is also a radio apparatus for master node, which is used in a radio communication system that performs radio communication by sharing, between the radio apparatus for master node and at least one radio apparatus for slave node, a frequency band used by another radio communication system without influencing the another radio communication system. The radio apparatus for master node comprises: a sensing section that observes a surrounding radio wave environment in a frequency band having a possibility of being available for communication; a control section that cognizes, based on a result of the observing by the sensing section, as an available frequency band, a frequency band that is not being used by the another radio communication system from the frequency band having the possibility of being available for the communication, to thereby determine a target frequency band to be actually used, and causes a transmission section to transmit, to the at least one radio apparatus for slave node, an instruction signal for instructing the at least one radio apparatus for slave node to observe the surrounding radio wave environment in the target frequency band; a reception section that receives a signal transmitted from the at least one radio apparatus for slave node; and a determination section that makes a final determination on whether or not the target frequency band is available based on information on a result of observing the radio wave environment, which is contained in the received signal.

According to a seventh aspect of this invention, there is provided a radio apparatus for slave node, which is used in combination with the radio apparatus for master node according to the fifth or sixth aspect. The radio apparatus for slave node includes a sensing section that receives the instruction signal transmitted from the radio apparatus for master node; a control section that observes the surrounding radio wave environment in a frequency band specified by the received instruction signal; and a section that sends, as a response, the result of observing the radio wave environment to the radio apparatus for master node under a predetermined condition or a condition specified by the received instruction signal.

According to this invention, it is possible to realize the method of exchanging the sensing information in the secondary system without influencing the communication of another radio communication system, for example, the primary system. Further, according to this invention, the secondary system uses the radio resources efficiently, which enables the master node to collect, from a wide frequency band, necessary sensing information at high speed and with a low processing amount when necessary.

BEST MODE FOR EMBODYING THE INVENTION

A detailed description is made of best mode for embodying this invention with reference to the drawings.

[First Embodiment]

Figure 1:
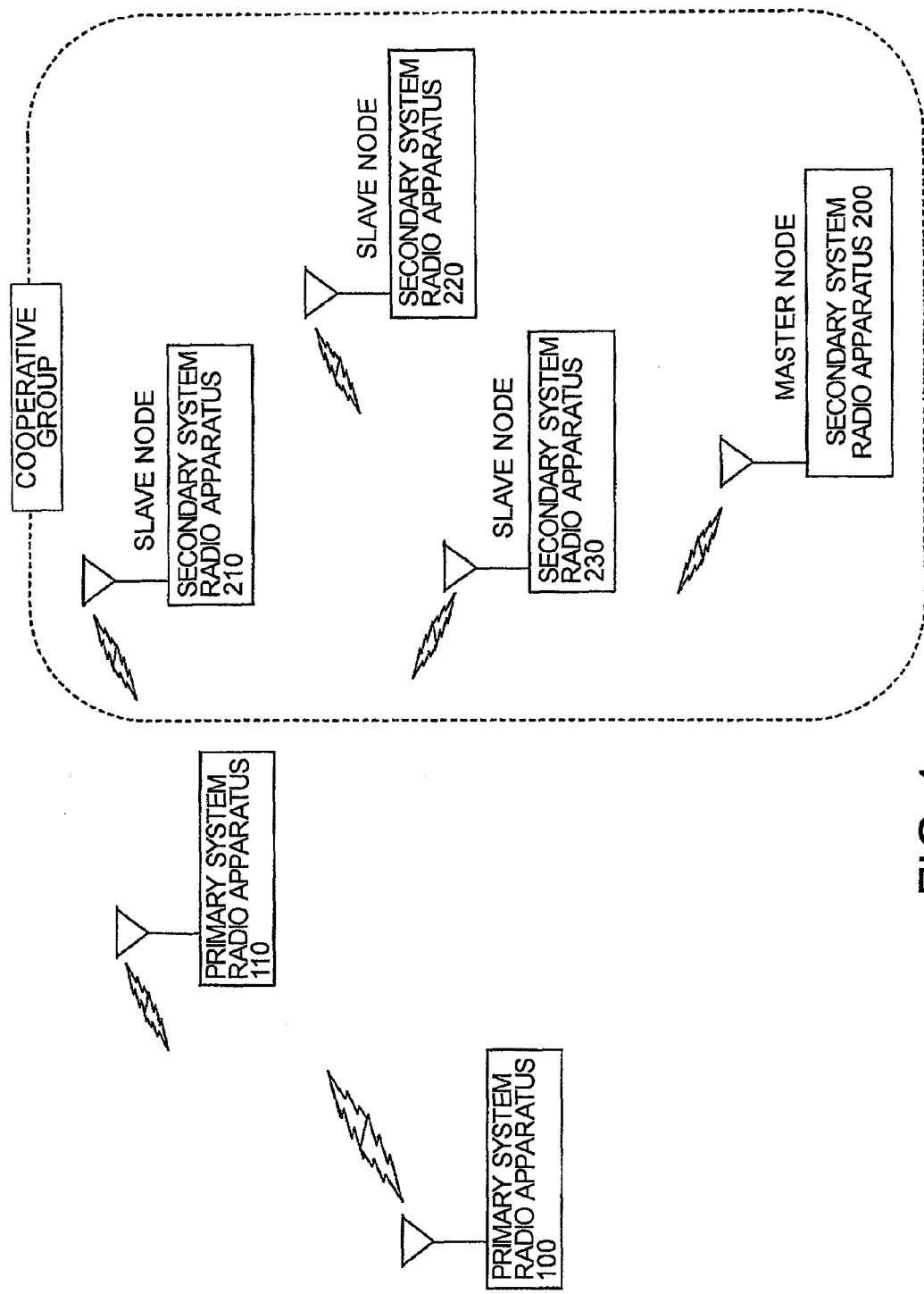
FIG. 1 is a diagram illustrating a configuration in which radio apparatus of a primary system and radio apparatus of a secondary system which perform cooperative sensing coexist.

In a first embodiment of this invention described below, there is given an example of cooperative sensing performed by a master node 200 and slave nodes 210, 220 and 230 constituting a cooperative group in the same configuration as in FIG. 1.

Figure 2:
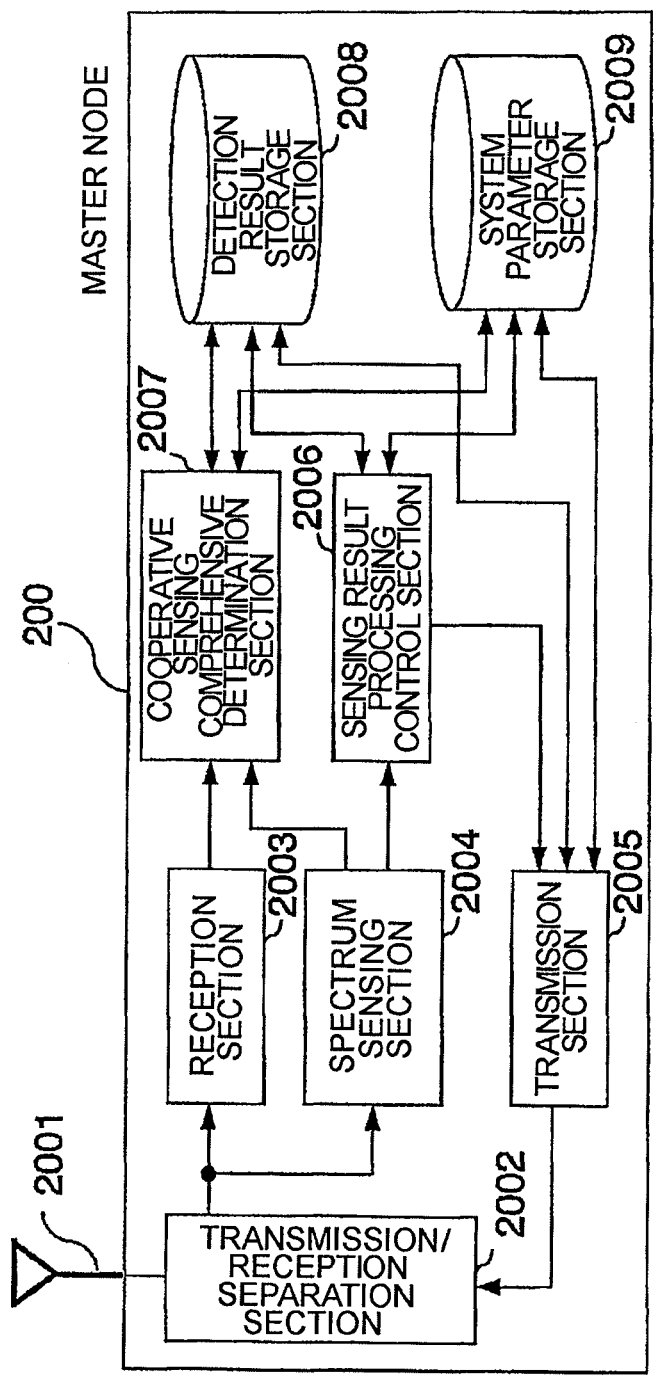
FIG. 2 is a block diagram illustrating a configuration of a master node that performs the cooperative sensing according to a first embodiment of this invention.

FIG. 2 illustrates an example of a configuration of the master node 200 according to the first embodiment of this invention. The master node 200 comprises an antenna 2001, a transmission/reception separation section 2002, a reception section 2003, a spectrum sensing section 2004, a transmission section 2005, a sensing result processing control section (control section) 2006, a cooperative sensing comprehensive determination section (determination section) 2007, a detection result storage section 2008, and a system parameter storage section 2009.

The reception section 2003 receives signals transmitted from such other nodes belonging to the cooperative group as the slave nodes 210 to 230 via the antenna 2001 and the transmission/reception separation section 2002, and then performs demodulation and decoding processing.

The transmission section 2005 carries out encoding and modulation processing on a signal directed to another node belonging to the cooperative group, and then transmits the resultant signal via the transmission/reception separation section 2002 and the antenna 2001. The signal to be transmitted may be added with information extracted from the detection result storage section 2008. The transmission section 2005 is capable of unicast transmission directed to a single specific node, is also capable of multicast transmission directed to a plurality of nodes, and is also capable of broadcast transmission directed to unspecified nodes. The transmission section 2005 accesses the system parameter storage section 2009 to set those transmission conditions and communication parameters.

The spectrum sensing section 2004 performs detection of whether or not a communication of a primary system exists in a frequency band to which spectrum sensing is applied (hereinafter, may be referred to as target frequency band).

In a case where it is determined, based on detection results from the spectrum sensing section 2004, that the primary system is not using the target frequency band, the sensing result processing control section 2006 controls the transmission section 2005 to transmit a signal for instructing the slave nodes within the cooperative group to perform spectrum sensing processing in the target frequency band. At this time, the transmission section 2005 sets the communication parameters stored in the system parameter storage section 2009 as described above. Further, the sensing result processing control section 2006 is capable of, through access to the detection result storage section 2008, storing results of the current spectrum sensing, and extracting the stored results of the spectrum sensing.

The cooperative sensing comprehensive determination section 2007 determines whether or not the communication of the primary system exists in the target frequency band in the cooperative group by taking into consideration information on spectrum sensing results obtained from the respective slave nodes, which are contained in the signals received from the slave nodes 210 to 230, and the result of the spectrum sensing performed by itself with the use of the spectrum sensing section 2004, and then stores a determination result in the detection result storage section 2008.

Figure 3:
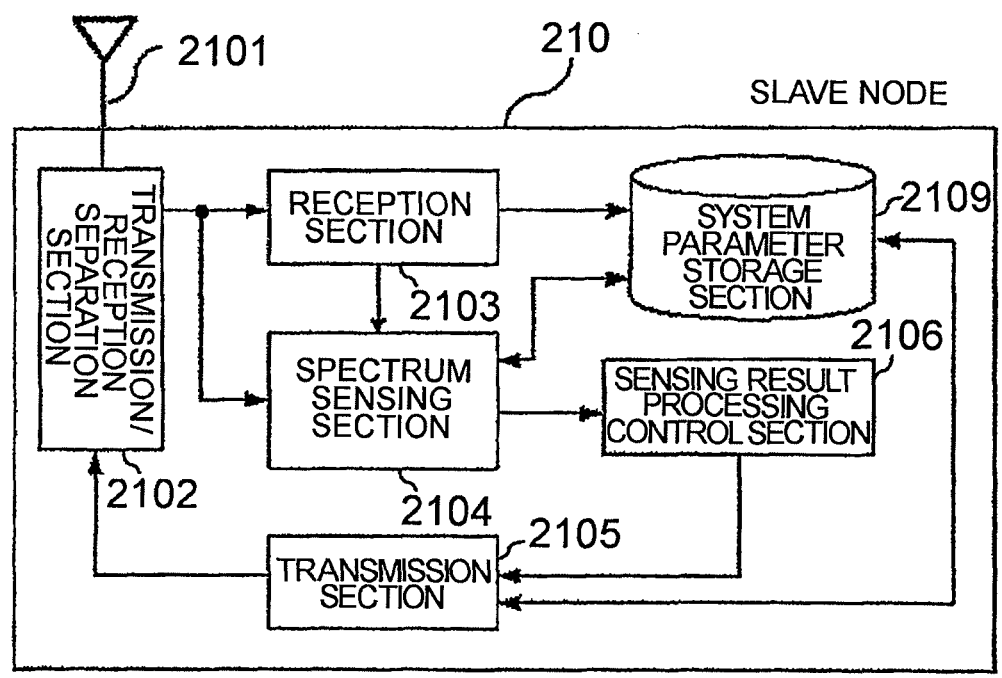
FIG. 3 is a block diagram illustrating a configuration of a slave node that performs the cooperative sensing according to first to third embodiments of this invention.

FIG. 3 illustrates an example of a configuration of the slave node 210 according to the first embodiment of this invention. The slave node 210 comprises an antenna 2101, a transmission/reception separation section 2102, a reception section 2103, a spectrum sensing section 2104, a transmission section 2105, a sensing result processing control section 2106, and a system parameter storage section 2109.

The reception section 2103 receives a signal transmitted from such other node belonging to the cooperative group as the master node 200 via the antenna 2101 and the transmission/reception separation section 2102, and then performs demodulation and decoding processing.

The transmission section 2105 carries out encoding and modulation processing on a signal directed to such other node belonging to the cooperative group as the master node 200, and then transmits the resultant signal via the transmission/reception separation section 2102 and the antenna 2101. The transmission section 2105 is capable of unicast transmission directed to a single specific node, is also capable of multicast transmission directed to a plurality of nodes, and is also capable of broadcast transmission directed to unspecified nodes. It should be noted that, in the example described herein, the result of the spectrum sensing is assumed to be unicast-transmitted to the master node 200. Based on an instruction given by the sensing result processing control section 2106, the transmission section 2105 accesses the system parameter storage section 2109 to set those transmission conditions and communication parameters.

The spectrum sensing section 2104 performs detection of whether or not the communication of the primary system exists in a frequency band to which the spectrum sensing is applied. In a case where the frequency band to which the spectrum sensing is applied (target frequency band) and other parameters necessary for the spectrum sensing are contained in a signal received from the master node 200, those pieces of data are provided from the reception section 2103. In a case where those pieces of data are stored in the system parameter storage section 2109, the spectrum sensing section 2104 accesses the system parameter storage section 2109 to set those pieces of data.

Based on a result of the spectrum sensing performed by the spectrum sensing section 2104, the sensing result processing control section 2106 controls, for example, a timing at which the transmission section 2105 transmits result information of the spectrum sensing.

Here, in the above description, it is assumed that, of the radio apparatus 200 to 230 of the secondary system, the radio apparatus 200 is the master node, and the other radio apparatus 210, 220, and 230 are the slave nodes. However, an arbitrary one of the radio apparatus 200 to 230 may be selected as the master node. In view of this, all the radio apparatus 200 to 230 of the secondary system desirably have the configuration of the master node illustrated in FIG. 2 and the configuration of the slave node illustrated in FIG. 3. This also applies to embodiments described later.

Figure 4:
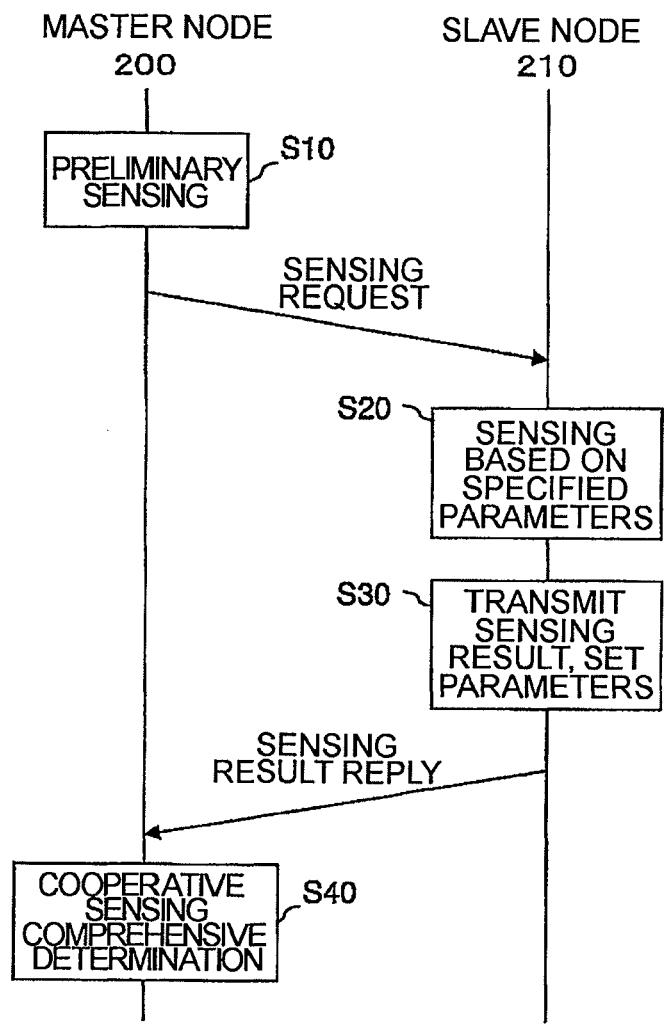
FIG. 4 is a flow chart illustrating a basic operation, focusing on a single slave node, according the first to third embodiments of this invention.

Next, a description is given of operation steps performed when the master node and the slave nodes belonging to the same cooperative group perform cooperative sensing. As the simplest example, FIG. 4 illustrates an exemplary basic operation steps performed between the master node 200 and the slave node 210. It should be noted that components of the master node and the slave node may be implemented by hardware, but may also be implemented by computers. In this case, a program for executing an operation described below is stored in a storage device, and, at the time of the operation, the computer reads the program from the storage device and executes the operation according to the read program.

The master node 200 performs in advance preliminary spectrum sensing with respect to a candidate frequency band (target frequency band) for exchanging cooperative sensing information (S10), to thereby obtain preliminary information on a status of band usage of the primary system. As a result of the preliminary spectrum sensing, if it is judged that the primary system is not using the target frequency band, the master node 200 transmits a sensing request (instruction signal) to the slave node 210 in its vicinity. Here, the sensing request contains a sensing request message containing parameters necessary for the sensing. Further, for the transmission of the sensing request, the same frequency band as that of the primary system may be used, or a part thereof may be used. Alternatively, another frequency band than that of the primary system may be used.

The slave node 210 that has received the sensing request performs the spectrum sensing processing based on the parameters contained in the sensing request message (S20). The parameters include at least one of a synchronization signal, a target frequency band of the spectrum sensing, a timing at which the spectrum sensing is started, information on nodes that perform the spectrum sensing, an averaging time of spectrum sensing results, a timing at which a spectrum sensing result reply is transmitted, and the like.

After the spectrum sensing processing S20 is performed, the slave node 210 sends, as a response, at a transmission timing specified by the parameters, information on the spectrum sensing result to the master node 200 as a sensing result reply message (S30).

The master node 200 receives the reply message and performs the demodulation thereof, and then, the master node 200 performs cooperative sensing comprehensive determination S40 based on the information on the spectrum sensing result obtained by the slave node 210, which is contained in the reply message. As a result, a surrounding environment about frequency usage may be understood. Here, as the information used for the cooperative sensing comprehensive determination S40, in addition to the information on the spectrum sensing result from the slave node 210, there may be used a sensing result of the preliminary spectrum sensing S10 performed by the master node 200, or a result of the spectrum sensing processing (not shown) performed by the master node 200 after the preliminary spectrum sensing processing.

It should be noted that a parameter group to be contained in the sensing request message may be set in advance between the master node and the slave node. In this case, the sensing request may be set simply as a beacon signal. Further, in such a case, the slave node may execute, as appropriate, the spectrum sensing autonomously based on the parameters set in advance, and the master node may control only a collection timing of sensing result information from the slave nodes by means of the sensing request.

Figure 5:
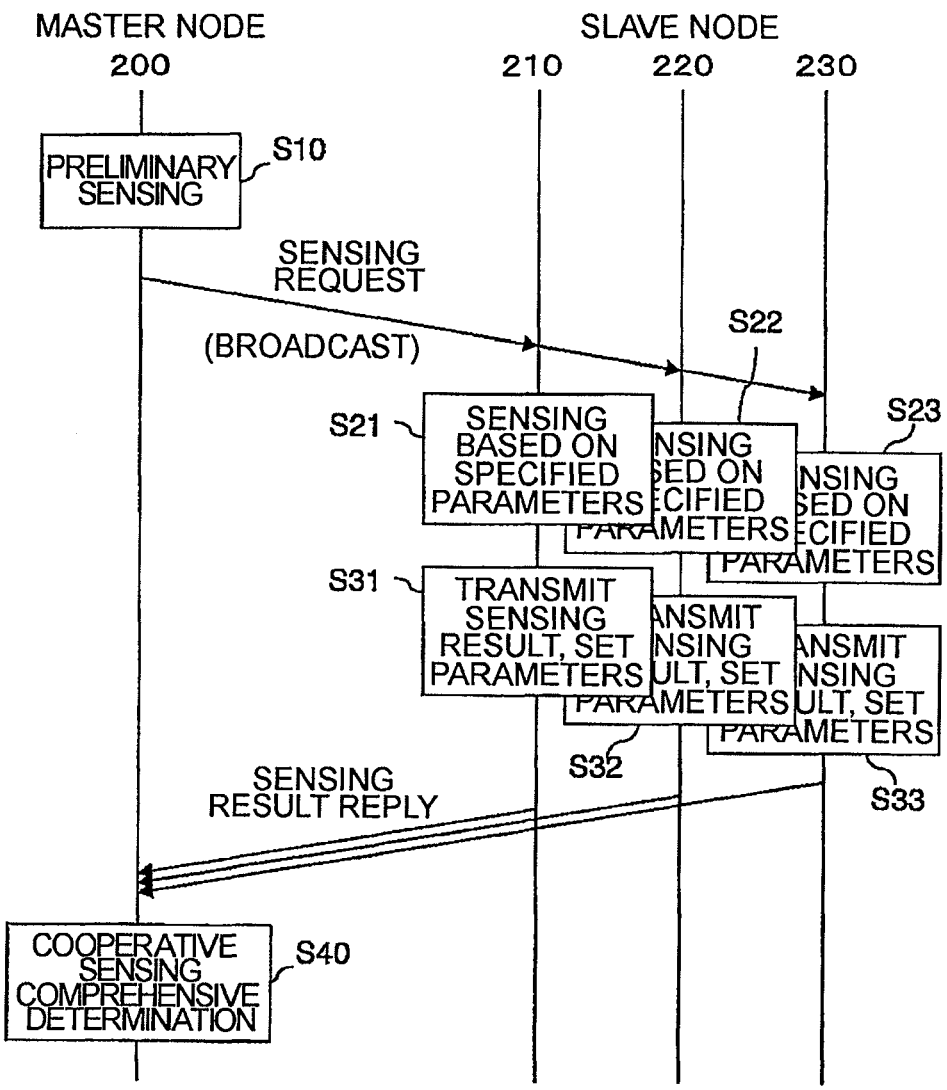
FIG. 5 is a flow chart illustrating an operation performed between the master node and the slave nodes according to the first to third embodiments of this invention.

FIG. 5 illustrates, as another operation example of the first embodiment, exemplary operation steps through which the master node 200 and the slave nodes 210 to 230 perform the cooperative sensing.

The master node 200 performs in advance the preliminary spectrum sensing with respect to the candidate frequency band (target frequency band) for exchanging the cooperative sensing information (S10), to thereby obtain the preliminary information on the status of frequency band usage of the primary system. As a result of the preliminary spectrum sensing, if it is judged that the primary system is not using the target frequency band, the master node 200 performs the broadcast transmission of the sensing request to a group of the surrounding slave nodes. For the transmission of the sensing request, the same frequency band as that of the primary system may be used, or a part thereof may be used. Alternatively, another frequency band than that of the primary system may be used.

The slave nodes 210 to 230 that have received the sensing request perform the sensing processing based on the parameters contained in the sensing request message (S21, S22, and S23). The parameters are as described above.

After the spectrum sensing processing is performed, the slave nodes 210 to 230 simultaneously send, as a response, at the transmission timing specified by the parameters, information on the spectrum sensing result to the master node 200 as the sensing result reply message (S31, S32, and S33). At this time, the signals transmitted from the respective slave nodes are discriminated by means of codes used in the code division multiple access (CDMA), subcarriers used in the orthogonal frequency division multiplexing (OFDM), or the like.

The master node 200 receives the reply messages from the slave nodes 210 to 230 and performs the demodulation thereof in a collective manner, and then, the master node 200 performs the cooperative sensing comprehensive determination S40 based on the information on the spectrum sensing result obtained by the slave nodes 210 to 230, which is contained in the reply messages. As a result, the surrounding environment about the frequency usage may be understood. Similarly to the example described above, as the information used for the cooperative sensing comprehensive determination S40, in addition to the information on the spectrum sensing result from the slave nodes 210 to 230, there may be used a result of the preliminary spectrum sensing S10 performed by the master node 200, or a result of the spectrum sensing processing (not shown) performed by the master node 200 after the preliminary spectrum sensing processing.

Figure 6:
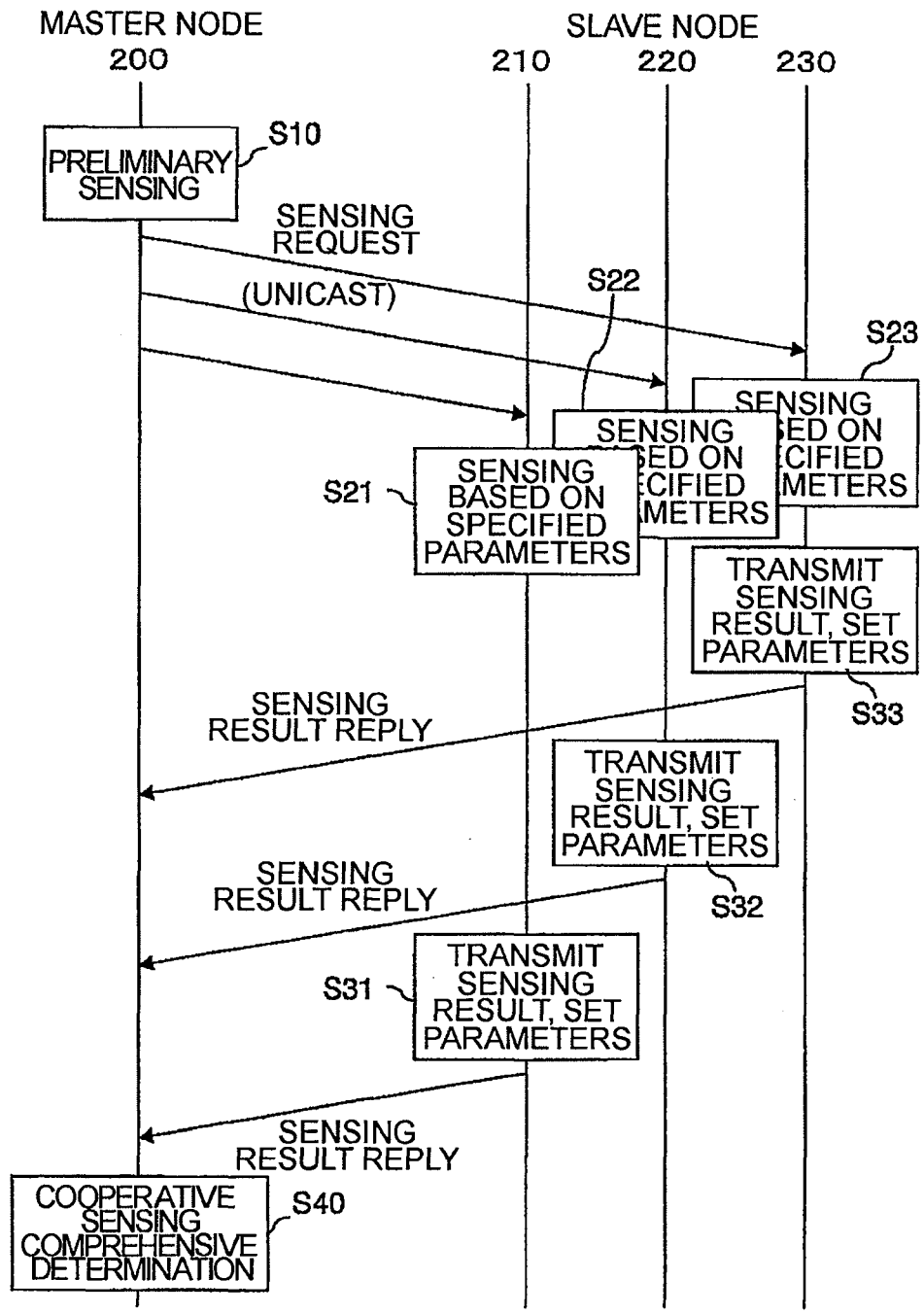
FIG. 6 is a flow chart illustrating another operation performed between the master node and the slave nodes according to the first to third embodiments of this invention.

According to this method, the master node is configured to broadcast the sensing request message, and hence the master node does not need to have detailed understanding of the slave nodes. Further, by simultaneously sending, as a response, the sensing result reply from the slave nodes as described above, it becomes possible to increase the efficiency in use of radio resources at the time of the operation of the cooperative sensing. It should be noted that this invention is not limited to the configuration in which the sensing request and the sensing result reply are broadcast and sent as a response simultaneously, respectively. As illustrated in FIG. 6, the message may be exchanged with each slave node separately.

In FIG. 6, the master node 200 performs the preliminary spectrum sensing with respect to the target frequency band (S10), to thereby obtain the preliminary information on the status of frequency band usage of the primary system. As a result of the preliminary spectrum sensing, if it is judged that the primary system is not using the target frequency band, the master node 200 transmits the sensing request separately to the slave nodes 210, 220, and 230 through the unicast transmission.

Similarly to the operation described with respect to FIG. 5, the slave nodes 210 to 230 that have received the sensing request perform the sensing processing based on the parameters contained in the sensing request message (S21, S22, and S23). After the spectrum sensing processing is performed, the slave nodes 210 to 230 simultaneously send, as a response, information on the spectrum sensing result to the master node 200 as the sensing result reply message at the transmission timing specified by the parameters (S31, S32, and S33).

The master node 200 receives the reply messages from the slave nodes 210 to 230 and performs the demodulation thereof, and then, the master node 200 performs the cooperative sensing comprehensive determination S40 based on the information on the spectrum sensing result obtained by the slave nodes 210 to 230, which is contained in the reply messages. As a result, the surrounding environment about the frequency usage is understood.

As described above, according to the first embodiment, the secondary system may efficiently use radio resources to exchange the sensing information without influencing the communication of the primary system.

[Second Embodiment]

Next, a detailed description is given of a second embodiment of this invention with reference to the drawings. In the second embodiment of this invention described below, too, based on the same configuration as in FIG. 1, there is given an example in which a master node 201 and the slave nodes 210 to 230 constituting the cooperative group perform the cooperative sensing. Here, the master node 201 plays the same role as the master node 200 of FIG. 1.

Figure 7:
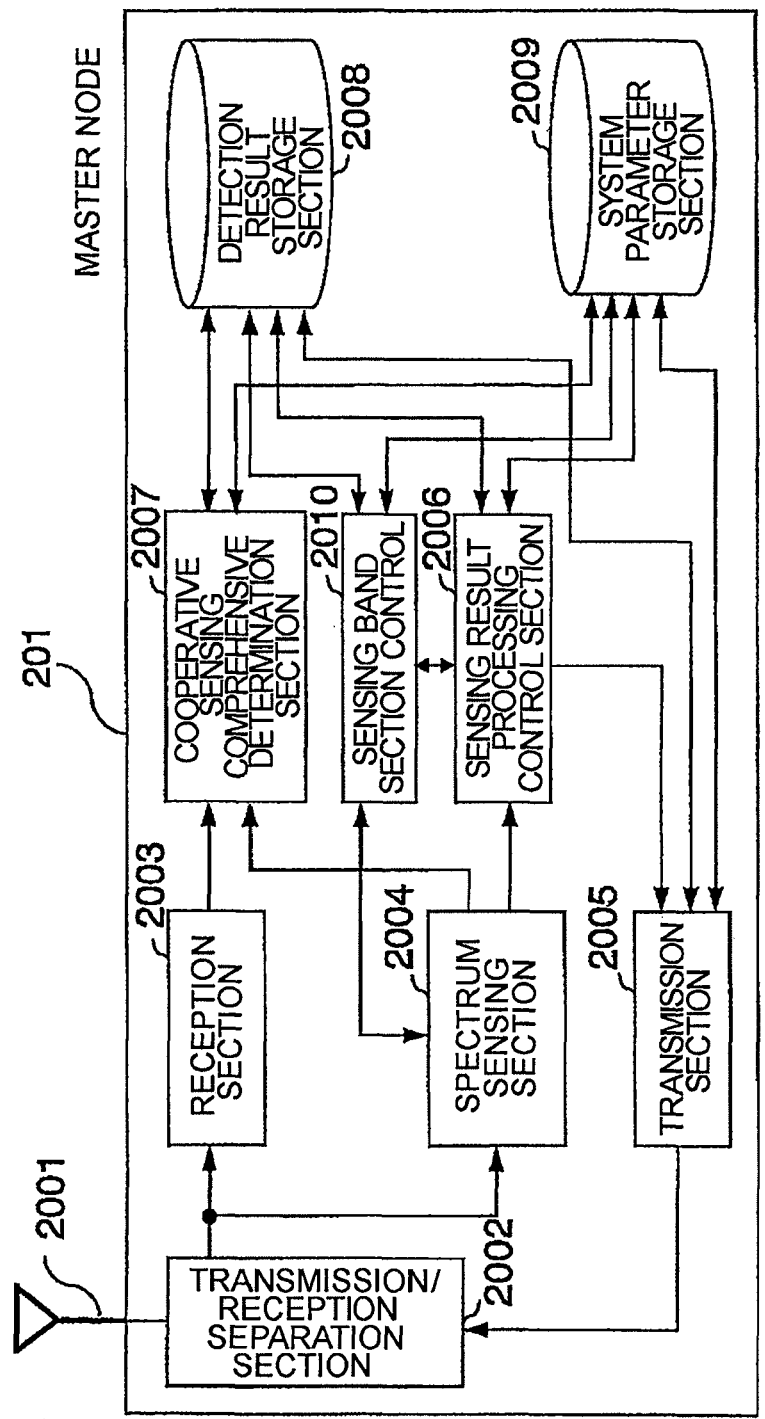
FIG. 7 is a block diagram illustrating a configuration of a master node that performs the cooperative sensing according to the second and third embodiments of this invention.

FIG. 7 illustrates an example of a configuration of the master node 201 according to the second embodiment of this invention. The master node 201 comprises an antenna 2001, a transmission/reception separation section 2002, a reception section 2003, a spectrum sensing section 2004', a transmission section 2005, a sensing result processing control section 2006, a cooperative sensing comprehensive determination section (determination section) 2007, a detection result storage section 2008, a system parameter storage section 2009, and a sensing band control section 2010.

The reception section 2003 receives signals transmitted from such other nodes belonging to the cooperative group as the slave nodes 210 to 230 via the antenna 2001 and the transmission/reception separation section 2002, and then performs demodulation and decoding processing.

The transmission section 2005 carries out encoding and modulation processing on a signal directed to another node belonging to the cooperative group, and then transmits the resultant signal via the transmission/reception separation section 2002 and the antenna 2001. The signal to be transmitted may be added with information extracted from the detection result storage section 2008. The transmission section 2005 is capable of unicast transmission directed to a single specific node and is also capable of multicast transmission directed to a plurality of nodes. The transmission section 2005 is also capable of broadcast transmission directed to unspecified nodes. The transmission section 2005 accesses the system parameter storage section 2009 to set those transmission conditions and communication parameters.

The spectrum sensing section 2004' performs detection of whether or not a communication of a primary system exists in a frequency band which is specified by the sensing band control section 2010 and to which spectrum sensing is to be applied.

In a case where it is determined, based on a result of the spectrum sensing from the spectrum sensing section 2004', that the primary system is not using the target frequency band, the sensing result processing control section 2006 determines a target frequency band in collaboration with the sensing band control section 2010. The sensing result processing control section 2006 subsequently controls the transmission section 2005 to transmit a signal for instructing the slave nodes within the cooperative group to perform the spectrum sensing processing in the determined target frequency band. At this time, the transmission section 2005 sets the communication parameters stored in the system parameter storage section 2009. The sensing result processing control section 2006 is capable of, through access to the detection result storage section 2008, storing results of the current spectrum sensing, and extracting the stored results of the spectrum sensing.

As described above, the sensing band control section 2010 controls the frequency band to which the spectrum sensing is applied by the master node 201 itself and the slave nodes associated therewith. The sensing band control section 2010 has a function of accessing the system parameter storage section 2009 and the detection result storage section 2008. The sensing band control section 2010 is further capable of obtaining information on a sensing result from the sensing result processing control section 2006 to determine a spectrum sensing frequency band of the master node 201 itself, and is capable of controlling, via the sensing result processing control section 2006, the transmission of information regarding a frequency band, to which the cooperative sensing is applied, to the slave nodes. In view of the description given above, the sensing result processing control section 2006 and the sensing band control section 2010 may be collectively referred to as a control section.

The cooperative sensing comprehensive determination section 2007 determines whether or not the communication of the primary system exists in the target frequency band in the cooperative group by taking into consideration information on spectrum sensing results obtained from the respective slave nodes, which are contained in the signals received from the slave nodes 210 to 230, and the result of the spectrum sensing performed by itself with the use of the spectrum sensing section 2004', and then stores a determination result in the detection result storage section 2008.

The slave node according to the second embodiment of this invention may be configured in the same manner as in the example of the configuration illustrated in FIG. 3.

Next, according to the second embodiment of this invention, a description is given of operation steps performed when the master node and the slave nodes belonging to the same cooperative group perform the cooperative sensing.

At the time of executing the preliminary spectrum sensing described in the first embodiment, the master node 201 executes the spectrum sensing over a wide range of the entirety of the frequency band candidate in advance. Based on a spectrum sensing result, the master node 201 determines a free frequency band candidate to be used for the secondary system. Specifically, of the wide-range frequency band in which the preliminary spectrum sensing has been performed, the master node 201 excludes a part of the frequency band in which the communication of the primary system is detected or a part of the frequency band that is judged to be unsatisfactory in terms of other radio environments from the free frequency band candidate to be used in the secondary system. The master node 201 may determine the free frequency band candidate for the secondary system after repeatedly performing the preliminary spectrum sensing processing to enhance the accuracy. The master node 201 broadcasts, with the use of the sensing request, the free frequency band candidate thus determined, to which the cooperative sensing is to be applied as the secondary system, to the surrounding slave nodes.

Here, at the time of the transmission of the sensing request, the master node 201 may use the same frequency band as that of the primary system, or may use a partial frequency band thereof. Alternatively, the master node 201 may use another frequency band than that of the primary system. Further, the transmission of the sensing request is not limited to the broadcast, and, similarly to the first embodiment, the unicast or the multicast may be used.

Each of the slave nodes performs the spectrum sensing with respect to the free frequency band candidate which is specified by the master node, and is contained in the received sensing request, and then sends, as a response, the sensing information through the same operation as in the first embodiment. Accordingly, the operation of the second embodiment may be implemented using the same flow as that of the operation steps described in FIGS. 4, 5, and 6.

According to the second embodiment of this invention, the range of the spectrum sensing to be performed by each slave node may be narrowed, which allows reduction in processing amount and speedup in collecting the sensing information.

[Third Embodiment]

Next, a detailed description is given of a third embodiment of this invention. In the third embodiment described below, too, based on the same configuration as in FIG. 1, there is given an example in which a master node 201 and the slave nodes 210 to 230 constituting the cooperative group perform the cooperative sensing. Here, the master node 201 plays the same role as the master node 200 described with respect to FIG. 1.

The master node according to the third embodiment of this invention may be configured in the same manner as in the example of the configuration illustrated in FIG. 7. The slave node according to the third embodiment may be configured in the same manner as in the example of the configuration illustrated in FIG. 3.

In the third embodiment, the master node and the slave nodes operate substantially in the same manner as in the second embodiment described above, but the sensing band control section 2010 of the master node 201 has a feature in operation thereof, in particular. Thus, hereinbelow, the operation according to the third embodiment is described focusing on a different point from the second embodiment described above.

In the third embodiment, similarly to the second embodiment described above, the master node 201 separately executes wideband preliminary spectrum sensing. For example, it is assumed that the preliminary spectrum sensing is applied to a frequency band 300 illustrated in FIG. 8. In determining the free frequency band candidate, the master node 201 selects a plurality of target frequency candidates for the cooperative sensing in ascending order of detected level among results of the preliminary spectrum sensing, that is, in descending order of probability of being the free frequency band, to thereby create a list thereof.

Figure 8:
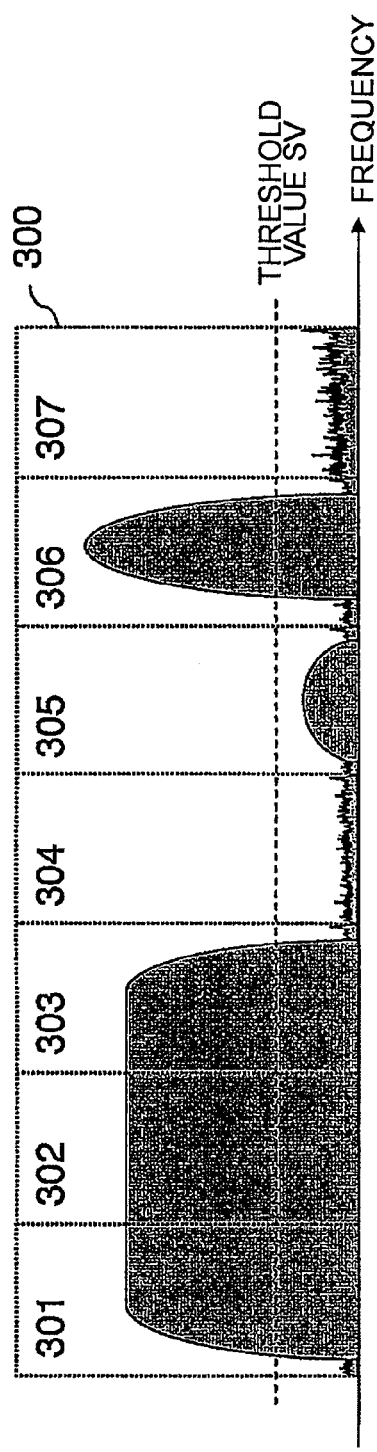
FIG. 8 is a diagram illustrating an example of results of spectrum sensing processing according to the third embodiment of this invention.

In the example illustrated in FIG. 8, a first-place candidate is a frequency band 304, a second-place candidate is a frequency band 307, and a third-place candidate is a frequency band 305. Here, in addition to the results of the preliminary spectrum sensing, the master node 201 may combine a determination made by using a threshold value SV as illustrated in FIG. 8.

In order from the first-place candidate, through the same steps as in the second embodiment, the cooperative sensing processing is executed based on, for example, the processing illustrated in FIGS. 4 to 6. As a result of the cooperative sensing processing, in a case where the cooperative sensing comprehensive determination section 2007 of the master node 201 judges that the candidate frequency band is not available, the cooperative sensing processing is executed with respect to a next candidate frequency. Hereinbelow, the processing is repeated in the same manner, to thereby discover an available frequency band.

It should be noted that, in the first to third embodiments, there is given an example in which all the slave nodes execute the cooperative sensing with respect to the same frequency band candidate at a given time point. However, each slave node may have a different frequency band candidate as a sensing target in a sharing manner. In this case, based on a candidate list of the target frequency band for the cooperative sensing, which is created in advance by the master node, sensing targets may be set by using information (including estimated value) on a location of the slave node, or information (including estimated value) on a distance between the slave node and the master node. Further, in a case where it is possible to obtain a pilot signal provided by the primary system or a common signal shared between the systems, those pieces of information may be used as auxiliary information.

In this manner, according to this invention, it is possible to realize a method of exchanging the sensing information in the secondary system without influencing the communication of the primary system. Further, according to this invention, the secondary system uses the radio resources efficiently, which enables the master node to collect, from a wide frequency band, necessary sensing information at high speed and with a low processing amount when necessary.

This invention has been described with reference to the plurality of embodiments, but this invention is not limited to the embodiments described above. Various modifications may be made, within an understanding of a person skilled in the art, to the configurations and the details of this invention without departing from the spirit and scope of this invention described in the claims. Examples of the modifications are listed below.

In this invention, the primary system is not limited to an existing radio communication system to which a frequency band is allocated in advance in a fixed manner. Specifically, this invention is not limited to a radio communication system in which a frequency band allocated to the existing radio communication system is shared between a first radio apparatus and at least one second radio apparatus, and a radio communication is performed without influencing the existing radio communication system. This invention is also applicable to a radio communication system in which a frequency band used by another radio communication system is shared between a first radio apparatus and at least one second radio apparatus, and a radio communication is performed without influencing the another radio communication system. For example, this invention is also applicable to such a case that the primary system has a preferential right to use the frequency band that the secondary system (target cognitive radio system) desires to use when frequency allocation is not fixed but employs moderate dynamic allocation.

Further, in a sharable frequency band, it is also possible to regard, as the primary system, another radio communication system that is given (or to be given) the same priority as the target cognitive radio system.

This application claims priority from Japanese Patent Application No. 2007-341277, filed on Dec. 28, 2007, and Japanese Patent Application No. 2008-287696, filed on Nov. 10, 2008 the entire disclosure of which is incorporated herein by reference.

The invention claimed is:

1. A radio communication system that performs radio communication by sharing, between a first radio apparatus and at least one second radio apparatus, a frequency band used by another radio communication system without influencing the another radio communication system, wherein:

the first radio apparatus comprises:

sensing means that observes a surrounding radio wave environment in a frequency band having a possibility of being available for communication; and control means that cognizes, based on a result of observing by the sensing means, as an available frequency band, a frequency band that is not being used by the another radio communication system from the frequency band having the possibility of being available for the communication, to thereby determine a target frequency band to be actually used, and causes transmission means to transmit, to the at least one second radio apparatus, an instruction signal for instructing the at least one second radio apparatus to observe the surrounding radio wave environment in the target frequency band;

the at least one second radio apparatus comprises:
means that receives the instruction signal and observes the surrounding radio wave environment in the target frequency band specified by the received instruction signal; and
means that sends, as a response, a result of observing the radio wave environment to the first radio apparatus under a predetermined condition or a condition specified by the received instruction signal; and the first radio apparatus further comprises determination means that makes a final determination on whether or not the target frequency band is available based on information on the result of observing the radio wave environment, which is received from the at least one second radio apparatus, wherein the control means of the first radio apparatus further has a function of determining, within the frequency band having the possibility of being available for the communication, a candidate ranking in descending order of probability of being available as a free frequency band among a plurality of candidates of a frequency band to be used for the communication, based on the result of the observing by the sensing means with respect to the surrounding radio wave environment in the frequency band having the possibility of being available for the communication;

the control means of the first radio apparatus observes, according to the determined candidate ranking, the surrounding radio wave environment with respect to the target frequency band of one of the plurality of candidates through an operation between the first radio apparatus and the at least one second radio apparatus; and the first radio apparatus determines whether or not the target frequency band of the one of the plurality of candidates is available based on the information on the result of observing the radio wave environment, which is received from the at least one second radio apparatus.

2. A radio communication system according to claim 1, wherein the instruction signal comprises a broadcast signal that does not require identifying a second radio apparatus as a transmission destination.

3. A radio communication system according to claim 1, wherein the instruction signal comprises a multicast signal that sets a plurality of specific second radio apparatus as recipients.

4. A radio communication system according to claim 1, wherein the instruction signal comprises a unicast signal that sets a single specific second radio apparatus as a recipient.

5. A radio communication system according to claim 1, wherein the instruction signal includes at least one of:
information for identifying the at least one second radio apparatus that is to observe the surrounding radio wave environment;
a synchronization signal for the at least one second radio apparatus to achieve synchronization with the first radio apparatus;
information regarding the target frequency band in which the at least one second radio apparatus is to observe the surrounding radio wave environment;
information regarding a timing at which the at least one second radio apparatus starts observing the surrounding radio wave environment;
information for the at least one second radio apparatus to average the results of observing the surrounding radio wave environment;
information regarding a form of a signal with which the at least one second radio apparatus sends, as the response, the result of observing the surrounding radio wave environment to the first radio apparatus; and
information regarding a timing at which the at least one second radio apparatus sends, as the response, the result of observing the surrounding radio wave environment to the first radio apparatus.

6. A radio communication system according to claim 1, wherein:
the instruction signal functions as a beacon signal including at least one of:
information for identifying the at least one second radio apparatus that is to observe the surrounding radio wave environment; and
a synchronization signal for the at least one second radio apparatus to achieve synchronization with the first radio apparatus; and
as a condition for observing the surrounding radio wave environment in the target frequency band to be used for the communication, the at least one second radio apparatus is provided with or notified of a content containing at least one piece of the following information in advance, or the content containing the at least one piece of the following information is inferable from a content of the received instruction signal,
the following information comprising:
information regarding the target frequency band in which the at least one second radio apparatus is to observe the surrounding radio wave environment;
information regarding a timing at which the at least one second radio apparatus starts observing the surrounding radio wave environment;
information for the at least one second radio apparatus to average the results of observing the surrounding radio wave environment;
information regarding a form of a signal with which the at least one second radio apparatus sends, as the response, the result of observing the surrounding radio wave environment to the first radio apparatus; and
information regarding a timing at which the at least one second radio apparatus sends, as the response, the result of observing the surrounding radio wave environment to the first radio apparatus.

7. A radio communication system according to claim 1, wherein:
the control means of the first radio apparatus sets, according to the determined candidate ranking, a first-place candidate, as the one of the plurality of candidates, as the target frequency band to be actually used, to thereby observe the surrounding radio wave environment through an operation between the first radio apparatus and the at least one second radio apparatus;
the first radio apparatus determines whether or not the target frequency band of the first-place candidate is available based on the information on the result of observing the radio wave environment, which is received from the at least one second radio apparatus, and, as a result, in a case where it is determined that the target frequency band of the first-place candidate is unavailable, sets a second-place candidate as the target frequency band to be actually used, to thereby observe the surrounding radio wave environment through the operation between the first radio apparatus and the at least one second radio apparatus; and the first radio apparatus determines whether or not the target frequency band of the second-place candidate is available based on the information on the result of observing the radio wave environment, which is received from the at least one second radio apparatus, and, as a result, in a case where it is determined that the target frequency band of the second-place candidate is unavailable, performs the operation repeatedly by descending through the candidate ranking, to thereby finally discover the target frequency band available for the communication.

8. A radio communication system according to claim 1, wherein, in observing the surrounding radio wave environment through an operation between the first radio apparatus and the at least one second radio apparatus, a plurality of the second radio apparatus observe different candidates of the target frequency band in a sharing manner at a given identical time point.

9. A radio communication system according to claim 1, wherein, in observing the surrounding radio wave environment through the operation between the first radio apparatus and the at least one second radio apparatus, when the first radio apparatus determines, as the frequency band to be used for the communication, the target frequency band in which the at least one second radio apparatus is to observe the surrounding radio wave environment, the first radio apparatus uses at least one of:

information on a location of the at least one second radio apparatus, or an estimated value of the information on the location;

information on a distance between the first radio apparatus and the at least one second radio apparatus, or an estimated value of the information on the distance; and information on a radio wave propagation environment between the first radio apparatus and the at least one second radio apparatus, or an estimated value of the radio wave propagation environment.

10. A radio communication method of performing radio communication by sharing, between a first radio apparatus and at least one second radio apparatus, a frequency band used by another radio communication system without influencing the another radio communication system, the radio communication method comprising:

observing, by the first radio apparatus, a surrounding radio wave environment in a frequency band having a possibility of being available for communication, and, as a result of the observing, cognizing a frequency band that is not being used by the another radio communication system as an available frequency band from the frequency band having the possibility of being available for the communication, to thereby determine the available frequency band as a target frequency band to be actually used;

further transmitting, by the first radio apparatus, to the at least one second radio apparatus, an instruction signal for instructing the at least one second radio apparatus to observe the surrounding radio wave environment in the target frequency band;

receiving, by the at least one second radio apparatus, the instruction signal, and observing the surrounding radio wave environment in the target frequency band specified by the received instruction signal;

further sending, as a response, by the at least one second radio apparatus, a result of observing the radio wave environment to the first radio apparatus under a predetermined condition or a condition specified by the received instruction signal;

making, by the first radio apparatus, a final determination on whether or not the target frequency band is available based on information on the result of observing the radio wave environment, which is received from the at least one second radio apparatus;

determining, by the first radio apparatus, within the frequency band having the possibility of being available for the communication, a candidate ranking in descending order of probability of being available as a free frequency band among a plurality of candidates of a frequency band to be actually used as the result of the observing the surrounding radio wave environment in the frequency band having the possibility of being available for the communication;

observing, by the first radio apparatus, according to the determined candidate ranking, the surrounding radio wave environment with respect to target frequency band of one of the plurality of candidates through an operation between the first radio apparatus and the at least one second radio apparatus; and determining, by the first radio apparatus, whether or not the target frequency band of the one of the plurality of candidates is available based on the information on the result of observing the radio wave environment, which is received from the at least one second radio apparatus.

11. A radio communication method according to claim 10, wherein the instruction signal comprises a broadcast signal that does not require identifying a second radio apparatus as a transmission destination.

12. A radio communication method according to claim 10, wherein the instruction signal comprises a multicast signal that sets a plurality of specific second radio apparatus as recipients.

13. A radio communication method according to claim 10, wherein the instruction signal comprises a unicast signal that sets a single specific second radio apparatus as a recipient.

14. A radio communication method according to claim 10, wherein the instruction signal includes at least one of:

information for identifying the at least one second radio apparatus that is to observe the surrounding radio wave environment;

a synchronization signal for the at least one second radio apparatus to achieve synchronization with the first radio apparatus;

information regarding the target frequency band in which the at least one second radio apparatus is to observe the surrounding radio wave environment;

information regarding a timing at which the at least one second radio apparatus starts observing the surrounding radio wave environment;

information for the at least one second radio apparatus to average the results of observing the surrounding radio wave environment;

information regarding a form of a signal with which the at least one second radio apparatus sends, as the response, the result of observing the surrounding radio wave environment to the first radio apparatus; and information regarding a timing at which the at least one second radio apparatus sends, as the response, the result of observing the surrounding radio wave environment to the first radio apparatus.

15. A radio communication method according to claim 10, wherein:
the instruction signal functions as a beacon signal containing at least one of:
information for identifying the at least one second radio apparatus that is to observe the surrounding radio wave environment; and
a synchronization signal for the at least one second radio apparatus to achieve synchronization with the first radio apparatus; and
as a condition for observing the surrounding radio wave environment in the target frequency band to be used for the communication, the at least one second radio apparatus is provided with or notified of a content containing at least one piece of the following information in advance, or the content containing the at least one piece of the following information is inferable from a content of the received instruction signal,
the following information comprising:
information regarding the target frequency band in which the at least one second radio apparatus is to observe the surrounding radio wave environment;
information regarding a timing at which the at least one second radio apparatus starts observing the surrounding radio wave environment;
information for the at least one second radio apparatus to average the results of observing the surrounding radio wave environment;
information regarding a form of a signal with which the at least one second radio apparatus sends, as the response, the result of observing the surrounding radio wave environment to the first radio apparatus; and
information regarding a timing at which the at least one second radio apparatus sends, as the response, the result of observing the surrounding radio wave environment to the first radio apparatus.

16. A radio communication method according to claim 10, further comprising:
setting, by the first radio apparatus, according to the determined candidate ranking, a first-place candidate, as the one of the plurality of candidates, as the target frequency band to be actually used, to thereby observe the surrounding radio wave environment through an operation between the first radio apparatus and the at least one second radio apparatus;
determining, by the first radio apparatus, whether or not the target frequency band of the first-place candidate is available based on the information on the result of observing the radio wave environment, which is received from the at least one second radio apparatus, and, as a result, in a case where it is determined that the target frequency band of the first-place candidate is unavailable, setting a second-place candidate as the target frequency band to be actually used, to thereby observe the surrounding radio wave environment through the operation between the first radio apparatus and the at least one second radio apparatus; and
determining, by the first radio apparatus, whether or not the target frequency band of the second-place candidate is available based on the information on the result of observing the radio wave environment, which is received from the at least one second radio apparatus, and, as a result, in a case where it is determined that the target frequency band of the second-place candidate is unavailable, performing the operation repeatedly by descending through the candidate ranking, to thereby finally discover the target frequency band available for the communication.

17. A radio communication method according to claim 10, wherein the observing the surrounding radio wave environment through an operation between the first radio apparatus and the at least one second radio apparatus comprises observing, by a plurality of the second radio apparatus, different candidates of the target frequency band in a sharing manner at a given identical time point.

18. A radio communication method according to claim 10, wherein the observing the surrounding radio wave environment through the operation between the first radio apparatus and the at least one second radio apparatus comprises using, by the first radio apparatus, when determining, as the frequency band to be used for the communication, the target frequency band in which the at least one second radio apparatus is to observe the surrounding radio wave environment, at least one of:
information on a location of the at least one second radio apparatus, or an estimated value of the information on the location;
information on a distance between the first radio apparatus and the at least one second radio apparatus, or an estimated value of the information on the distance; and
information on a radio wave propagation environment between the first radio apparatus and the at least one second radio apparatus, or an estimated value of the radio wave propagation environment.

19. A non-transitory recording medium having a program recorded thereon, the program being used in performing radio communication by sharing, between a first radio apparatus and at least one second radio apparatus, a frequency band used by another radio communication system without influencing the another radio communication system,
the program causing a computer of the first radio apparatus to execute the steps of:
observing a surrounding radio wave environment in a frequency band having a possibility of being available for communication;
cognizing, based on a result of the observing, a frequency band that is not being used by the another radio communication system as an available frequency band from the frequency band having the possibility of being available for the communication, to thereby determine a target frequency band to be actually used;
transmitting, to the at least one second radio apparatus, an instruction signal for instructing the at least one second radio apparatus to observe the surrounding radio wave environment in the target frequency band;
receiving a result of observing the radio wave environment from the at least one second radio apparatus; and
making a final determination on whether or not the target frequency band is available based on information on the result of observing the radio wave environment, which is received from the at least one second radio apparatus,
wherein the step of determining the target frequency band comprises determining, within the frequency band having the possibility of being available for the communication, a candidate ranking in descending order of probability of being available as a free frequency band among a plurality of candidates of a frequency band to be actually used, based on the result of the observing;
the step of transmitting the instruction signal comprises transmitting, to the at least one second radio apparatus, an instruction signal for instructing the at least one second radio apparatus to observe the surrounding radio wave environment with one of the plurality of candidates set as the target frequency band to be actually used according to the determined candidate ranking; and the step of determining whether or not the target frequency band is available comprises determining, based on the information on the result of observing the radio wave environment, which is received from the at least one second radio apparatus, whether or not the target frequency band of the one of the plurality of candidates is available.

20. A non-transitory recording medium having the program recorded thereon according to claim 19, wherein:

the step of transmitting the instruction signal comprises transmitting, to the at least one second radio apparatus, an instruction signal for instructing the at least one second radio apparatus to observe the surrounding radio wave environment with a first-place candidate, as the one of the plurality of candidates, set as the target frequency band to be actually used according to the determined candidate ranking;

the step of determining whether or not the target frequency band is available comprises:

determining, based on the information on the result of observing the radio wave environment, which is received from the at least one second radio apparatus, whether or not the target frequency band of the first-place candidate is available;

as a result, in a case where it is determined that the target frequency band of the first-place candidate is unavailable, setting a second-place candidate as the target frequency band to be actually used, and transmitting an instruction signal for giving an instruction to observe the surrounding radio wave environment;

determining, based on the information on the result of observing the radio wave environment, which is received from the at least one second radio apparatus, whether or not the target frequency band of the second-place candidate is available; and as a result, in a case where it is determined that the target frequency band of the second-place candidate is unavailable, performing the above-mentioned operations repeatedly by descending through the candidate ranking, to thereby finally discover the target frequency band available for the communication.

21. A non-transitory recording medium having the program recorded thereon according to claim 19, wherein the step of transmitting the instruction signal comprises transmitting, to the plurality of the second radio apparatus, an instruction signal for instructing the plurality of the second radio apparatus to observe different candidates of the target frequency band in a sharing manner at a given identical time point in observing the surrounding radio wave environment.

22. A radio apparatus for master node, which is used in a radio communication system that performs radio communication by sharing, between the radio apparatus for master node and at least one radio apparatus for slave node, a frequency band used by another radio communication system without influencing the another radio communication system, the radio apparatus for master node comprising:

sensing means that observes a surrounding radio wave environment in a frequency band having a possibility of being available for communication;

control means that cognizes, based on a result of the observing by the sensing means, as an available frequency band, a frequency band that is not being used by the another radio communication system from the frequency band having the possibility of being available for the communication, to thereby determine a target frequency band to be actually used, and causing transmission means to transmit, to the at least one radio apparatus for slave node, an instruction signal for instructing the at least one radio apparatus for slave node to observe the surrounding radio wave environment in the target frequency band;

reception means that receives a signal transmitted from the at least one radio apparatus for slave node; and determination means that makes a final determination on whether or not the target frequency band is available based on information on a result of observing the radio wave environment, which is contained in the received signal, wherein the control means has a function of determining, within the frequency band having the possibility of being available for the communication, a candidate ranking in descending order of probability of being available as a free frequency band among a plurality of candidates of a frequency band to be actually used, based on the result of the observing by the sensing means;

the control means transmits, to the at least one radio apparatus for slave node, an instruction signal for instructing the at least one radio apparatus for slave node to observe the surrounding radio wave environment with one of the plurality of candidates set as the target frequency band to be actually used according to the determined candidate ranking; and the determination means determines whether or not the target frequency band of the one of the plurality of candidates is available based on the information on the result of observing the radio wave environment, which is received from the at least one radio apparatus for slave node.

23. A radio apparatus according to claim 22, wherein:

the control means further transmits, to the at least one radio apparatus for slave node, an instruction signal for instructing the at least one radio apparatus for slave node to observe the surrounding radio wave environment with a first-place candidate, as the one of the plurality of candidates, set as the target frequency band to be actually used according to the determined candidate ranking;

the determination means determines whether or not the target frequency band of the first-place candidate is available based on the information on the result of observing the radio wave environment, which is received from the at least one radio apparatus for slave node;

as a result, in a case where it is determined that the target frequency band of the first-place candidate is unavailable, the control means sets a second-place candidate as the target frequency band to be actually used, and transmits an instruction signal for giving an instruction to observe the surrounding radio wave environment; and the determination means determines whether or not the target frequency band of the second-place candidate is available based on the information on the result of observing the radio wave environment, which is received from the at least one radio apparatus for slave node, and, as a result, in a case where it is determined that the target frequency band of the second-place candidate is unavailable, performs the above-mentioned operations repeatedly by descending through the candidate ranking, to thereby finally discover the target frequency band available for the communication.

24. A radio apparatus according to claim 22, wherein the control means transmits, to the plurality of the radio apparatus for slave node, an instruction signal for instructing the plurality of the radio apparatus for slave node to observe different candidates of the target frequency band in a sharing manner at a given identical time point in observing the surrounding radio wave environment.

25. A radio apparatus for slave node, which is used in combination with the radio apparatus for master node according to claim 22, comprising:
   reception means that receives the instruction signal transmitted from the radio apparatus for master node;
   sensing means that observes the surrounding radio wave environment in a frequency band specified by the received instruction signal; and
   control means that sends, as a response, the result of observing the radio wave environment to the radio apparatus for master node under a predetermined condition or a condition specified by the received instruction signal.

* * * * *

UNITED STATES PATENT AND TRADEMARK OFFICE
CERTIFICATE OF CORRECTION

PATENT NO. : 8,472,378 B2
APPLICATION NO. : 12/808975
DATED : June 25, 2013
INVENTOR(S) : Masayuki Ariyoshi et al.

It is certified that error appears in the above-identified patent and that said Letters Patent is hereby corrected as shown below:

Title Page item (30) Foreign Application Priority Data please delete "Nov. 20, 2008" and replace with \*\*\*Nov. 10, 2008\*\*\*

Signed and Sealed this
Fifth Day of November, 2013

Teresa Stanek Rea
*Deputy Director of the United States Patent and Trademark Office*